INVENTOR.
EMANUEL BRIGUGLIO
BY Walter R. Pflueger Jr

INVENTOR.
EMANUEL BRIGUGLIO
BY
Walter R. Pfluger Jr

INVENTOR.
EMANUEL BRIGUGLIO
BY
Walter R. Pfluger Jr.

United States Patent Office 3,328,585

Patented June 27, 1967

3,328,585

OPTICAL PATH LENGTH DIFFERENCE COMPENSATED FLYING-SPOT SCANNER

Emanuel Briguglio, Riverdale, Md., assignor, by mesne assignments, to General Precision, Inc., Binghamton, N.Y., a corporation of Delaware Filed Apr. 23, 1964, Ser. No. 362,005
11 Claims. (Cl. 250—217)

ABSTRACT OF THE DISCLOSURE

This disclosure describes apparatus for controlling the intensity of the light output from a flying spot scanner to maintain that intensity uniform over the entire area being scanned. The apparatus comprises a monitoring photosensitive pickup which receives light from the scanner and generates an electrical signal proportional to the intensity of the light it receives. This electrical signal is compared in a comparator with a reference signal and the resultant output is used to control the intensity of the flying spot. Since the optical path changes as the scanner scans, the variations due to scanning in the intensity of the light striking the monitor photocell are compensated by curving the information bearing surface about the same point as the face of the scanner is curved. In addition, variable density filters are added to the photocells to intercept the energy transmitted to them. The density of the filters varies as the cosine of the angle made by the optical path of the spot at any time with the optical axis of the spot in the center of its scan and also in proportion to the reciprocal of the squares of the relative distances of points on the information bearing surface and the face of the scanner.

*Background of the invention*

This invention relates to the compensation of various errors which exist in conventional flying-spot scanners that limit their usefulness. More particularly it relates to a cathode ray tube flying-spot scanner which compensates for the errors resulting from differences in optical path lengths, differences in angles between the normal and rays of incident light received by the pick-up sensor from various points of constant illumination on the scanned surface, as well as for differences in spot intensity on the cathode ray tube (CRT) face.

Flying spot scanners have been used in one form or another for many years. They have become increasingly popular in recent years with the data processing arts, since they can be used to optically convert information presented in parallel form into information presented in serial form. However, where the intensity or amplitude of the converted information is important, flying spot scanners of the cathode ray tube type have suffered from serious limitations. The most important of these is the variation in the intensity of the spot of light which is generated at different locations on the face of the tube. These variations generated in the light at the source further modulate the information being presented to the detriment of the entire operation.

It is accordingly an object of this invention to provide an improved flying-spot scanning system for general application.

It is a further object to provide a flying-spot scanning system which compensates for errors resulting from differences in optical path lengths and angular differences of rays of incident light received by the pickup sensor from the scanned surface.

It is a still further object to provide a cathode ray tube type flying-spot scanner which compensates for variations in spot intensity on the tube face.

It is a feature of this invention that it employs conventional devices but in a novel manner to obtain excellent compensation for the inherent errors in a conventional flying-spot scanning system.

These and additional objects and features are accomplished in the present invention with a short-persistence CRT which scans information bearing material of some form and by providing in a feedback loop with the CRT control grid, a monitoring photomultiplier to sample the intensity of radiation from the screen. The output of the monitoring photomultiplier is compared with a reference intensity signal, and the resulting signal is amplified and applied to the intensifying control grid of the CRT to serve the flying-spot on the screen to a desired intensity. A variable density filter or vignetter is placed over the photosensitive area of the monitoring photomultiplier according to the geometry of the system to attenuate the incident rays inversely as the square of the distance between any particular spot location and the photosensitive area and directly as the cosine of the angle which the normal to the photosensitive area makes with the direction of the incident light. The pick-up photomultiplier tube is then oriented to the same angular relationship with the information bearing surface as the monitoring photomultiplier bears to the tube screen, so that each discrete spot position on the CRT screen, as projected, affects both the monitoring and pick-up photomultipliers in the same way with respect to the other spot positions. A second vignetter is then placed over the photosensitive area of the pick-up photomultiplier to produce the same compensation as for the monitoring photomultiplier. The result of all this is that the information bearing material is scanned with a constant illumination spot, and constant illumination returns from along the scanned surface are received as equal signals by the pick-up photomultiplier.

The following description and drawings will give a fuller appreciation of these and other features of this invention in which.

Figure 1A:
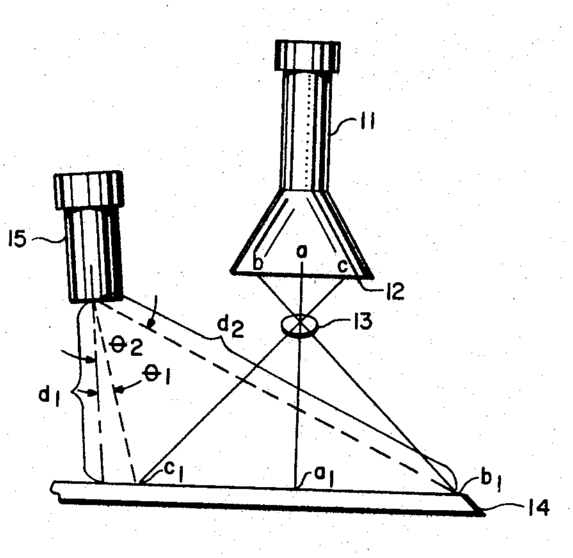
PRIOR ART FIG. 1A
FIG. 1A is a diagrammatic illustration of the errors inherent in a conventional reflector type flying-spot scanner system.

A conventional cathode ray tube reflector type flying-spot scanning system which illustrates the errors inherent in this system is shown in FIGURE 1A. The source of radiant energy is cathode ray tube 11 which forms on its short-persistence screen 12 a flying-spot or scanning raster usually in the form of rapidly recaying, interlaced, horizontal lines. The inverted image of this pattern is focused through lens 13 onto an opaque information bearing material 14. Spot $b$ at the start of a typical raster line is focused to point $b_1$ on the scanned material 14, then the spot proceeds to point $a$ on the center of the same raster line and scans through lens 13 to the point $a_1$ on the material 14, and finally the spot proceeds to point $c$ at the end of the raster line and scans through lens 13 to the point $c_1$ on material 14. As is well known, the relative blackness of the discrete bits of information on material 14 determines the amount of light which is absorbed, and it is the difference between the incident energy on material 14 and the amount which is absorbed by the bits of information which is reflected to the sensing device represented in FIGURE 1A by photomultiplier 15. In this manner the radiant energy in the scanning spot on the cathode ray tube 11 passes to the photomultiplier 15 and excites a photoelectric current whose magnitude depends upon the absorption of the energy by the information on material 14. As the scanning spot moves along the raster pattern, its image on information bearing material 14 encounters various degrees of optical absorption corresponding to highlights, halftones and shadows and these variations are reproduced in the photoelectric current in photomultiplier 15 which is read out in some convenient device such as a television picture tube.

According to the laws of illumination, the intensity of illumination of an illuminated surface is inversely proportional to the square of the distance from a point source, and directly proportional to the cosine of the angle which the normal to the illuminated surface makes with the direction of the incident light. Reference to FIGURE 1A will therefore show that for constant illumination along line $c_1b_1$ on material 14, the intensity of the radiated energy received at photomultiplier 15 will be less from point $b_1$ than from point $c_1$, both because the distance $d_2$ travelled by the reflected energy from point $b_1$ is greater than the distance $d_1$ travelled by the reflected energy from point $c_1$, and also because cosine $\theta_1$ is greater than cosine $\theta_2$. In other words the energy received by sensor 15 from a spot of constant intensity along line $c_1b_1$ will vary directly with cosine $\theta$ and inversely with $d_2$, with infinite variations possible.

Figure 1B:
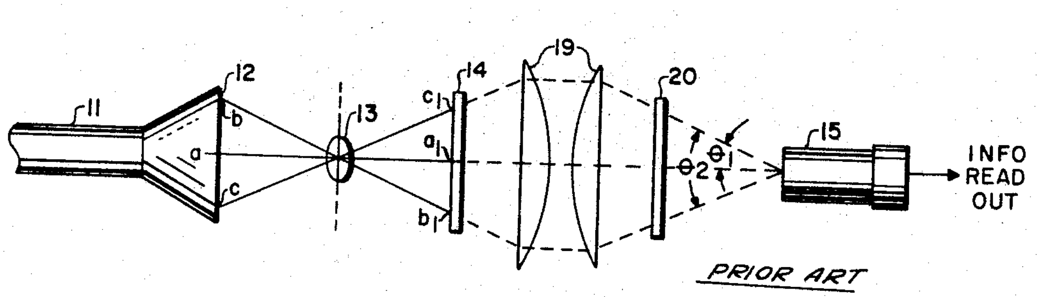
PRIOR ART FIG. 1B
FIG. 1B is a diagrammatic illustration of the errors inherent in a conventional transparency type flying-spot scanner system.

FIGURE 1B illustrates the conventional cathode ray tube transparent type flying-spot scanning system. Again the source of energy is the electron beam of a CRT 11 which forms on its short-persistence screen 12 a scanning pattern of flying spots. The image of the pattern is focused through lens 13 on to transparent slide or film 14, and the radiant energy passing through slide 14 is collected in condensing-lens system 19 and focused through ultraviolet filter 20 to the cathode of photomultiplier 15. As before, the magnitude of the information read out current in photomultiplier 15 depends on the absorption of the radiant energy from the scanning spot as it passes through slide 14. Reference to FIGURE 1B will show that the path length of rays $c_1$ and $b_1$ from the slide 14 to photomultiplier 15 differs from the path length of ray $a_1$ from slide 14 to photomultiplier 15, and the cosine of the angles $\theta_1$ and $\theta_2$ which the rays $c_1$ and $b_1$ make with the normal to the illuminated photosensitive surface of the photomultiplier 15 is less than for ray $a_1$ whose path lies along the normal. Therefore if no compensation is provided in the system of FIGURE 1B, the intensity of illumination received by photomultiplier 15 from points $c_1$ and $b_1$ will be appreciably less than from point $a_1$, even though the intensity of illumination at each of these points after passing through the slide 14 is equal.

In addition to these optical errors, variations in spot intensity on the screen 12 of the CRT 11 exist mainly because of a non-uniform phosphor coating. This error can be as much as ±10 percent.

Figure 2A:
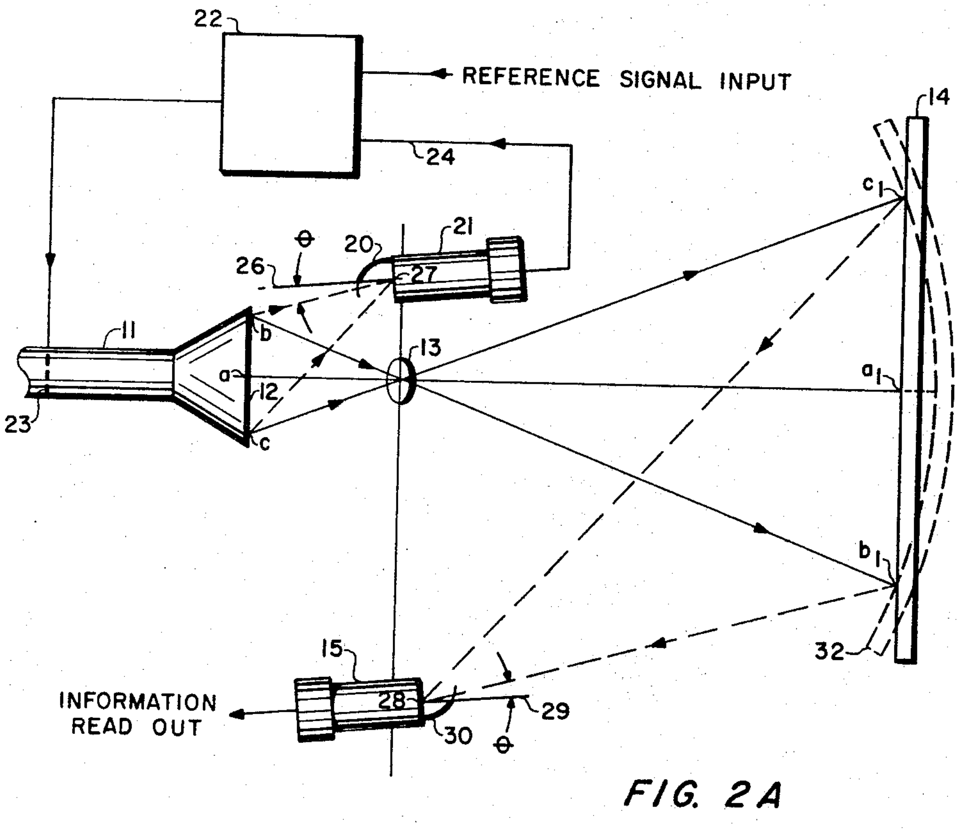
FIG. 2A is a diagrammatic representation of a reflection type embodiment of the flying-spot scanning system of the present invention.

FIGURE 2A illustrates in block diagram form the reflection type flying-spot scanning system of the present invention. CRT 11 produces a scanning pattern on its quick-decay phosphor screen 12, the intensity of the spots on the screen being theoretically constant if the potential on control grid 23 remains constant. Assuming that the spot moves from one end $c$ of a typical raster line through the middle of the line $a$ to the opposite end of the line $b$ before blanking out and retracing, the corresponding image of the spot locations will be inverted through lens 13 and focused at points $b_1$, $a_1$ and $c_1$, on the information bearing material 14.

It is obvious that for accurate read out of the information, the subject has to be scanned with a constant intensity spot. If in the first instance, the spot traveling across the screen 12 varies in intensity before it even starts to radiate from the screen, there is little chance for the scanning image on material 14 to have constant intensity along the scanning line.

The first requirement for compensation is that the error between the desired and actual spot intensity on the CRT face 12 be detected and controlled. The reference signal input to comparator 22 shown in block form in FIGURE 2A is set at a predetermined value before the start of each sweep to produce a desired spot intensity. The output of comparator 22 in turn controls the spot intensity on the face 12 of the CRT during the sweep period. Phototube 21, which in the present embodiment is a photomultiplier, forms a feedback loop with the radiated energy from CRT 11, comparator 22 and control grid 23 which serves as the intensifying electrode. Any other electrode which can be controlled to vary the intensity of the electron beam could be used as well. As shown in FIGURE 2A, photomultiplier 21 samples the radiated energy from the spot as it proceeds along the screen 12. If the spot intensity varies, the result is immediately apparent as a change in the magnitude of the photoelectric output current from photomultiplier 21 which is applied to input 24 of comparator 22. If the spot intensity is high, the photomultiplier signal on input 24 is higher than the reference signal input to the comparator and the comparator output is reduced, thereby reducing the voltage on control grid 23 and reducing the intensity of the electron beam and spot. Similarly if the spot intensity is low, the magnitude of the photomultiplier output 24 is lower than the reference signal input, and the output of comparator 22 increases to increase the signal to the control grid 23 and increase the spot intensity on the screen 12.

However, monitoring photomultiplier 21 is subject to the same errors as the pick-up photomultiplier 15 in the conventional system, i.e., energy from point $c$ will be attenuated more than energy from point $b$ due to the differences in optical path lengths from point $b$ to point 27 at the photocathode and differences between the cosines of the angles between the emergent rays and the normal 26 to the photocathode area. When photomultiplier 21 experiences at its photocathode 27 a constant energy input from each of the spot points $c$, $a$ and $b$ on tube screen 12, it does not necessarily indicate constant illumination at points $c$, $a$ and $b$. Due to the attenuation in intensity of the radiation in traveling from each of these points to the photocathode 27, the illumination of each of these points on the tube screen is not equal, even though the energies are equal at the photosensitive area 27. In fact, the actual spot intensities on the tube face 12 will vary as the cosine $\theta$ and inverse square laws figured back from the photocathode 27 without further compensation.

Pick-up photomultiplier 15 is positioned so that it bears the same geometrical relationship wth respect to information bearing surface 14 as monitoring photomultiplier 21 bears to CRT screen 12. Therefore, pick-up photomultiplier 15 will experience the same energy response on its photocathode 28 as monitoring photomultiplier 21 experiences on its photocathode 27 when the projected energy at points $c_1$, $a_1$ and $b_1$ is distributed in the same proportions as at $c$, $a$ and $b$. If the spot images in traveling from tube screen 12 to information bearing surface 14 are attenuated equally, the energy distribution will be the same at the screen and information bearing surface. In order to eliminate any unequal attenuation, the information bearing material can be positioned over the spherical surface 32 represented by the dashed lines. The optical path lengths and cosine $\theta$'s will then be equal for each spot projection.

To complete the compensation, vignetters 20 and 30 are placed over monitoring photomultiplier 21 and pick-up photomultiplier 15 to intercept the radiated energy falling on their respective photosensitive surfaces. These so called vignetters are variable density filters which attenuate the energy passing through them according to the filter density. Therefore, referring to FIGURE 2A, vignetter 20 would be most dense in the portion intercepting rays from $b$ and would gradually decrease in density down to the point where it intercepts rays from the spot on the opposite end $c$ of the scanning line where the rays have the longest optical path to the photocathode and make the largest angle with normal 26 to the photocathode. Similarly viginetter 30 on pick-up photomultiplier 15 would attenuate rays from point $b_1$ more than from point $c_1$. With proper density control the vignetters can so compensate for the inverse square law and cosine $\theta$ attenuation that the spot intensity over the screen 12 can be held constant with the feedback loop shown. In practice, it is not necessary to have the vignetter completely cover the respective photocathodes to achieve the required compensation. As shown in FIGURE 2A, by positioning the vignetter to filter those rays which are least attenuated by the inverse square and cosine $\theta$ attenuation laws, it is not necessary to filter the more completely attenuated rays to achieve satisfactory compensation.

Figure 3:
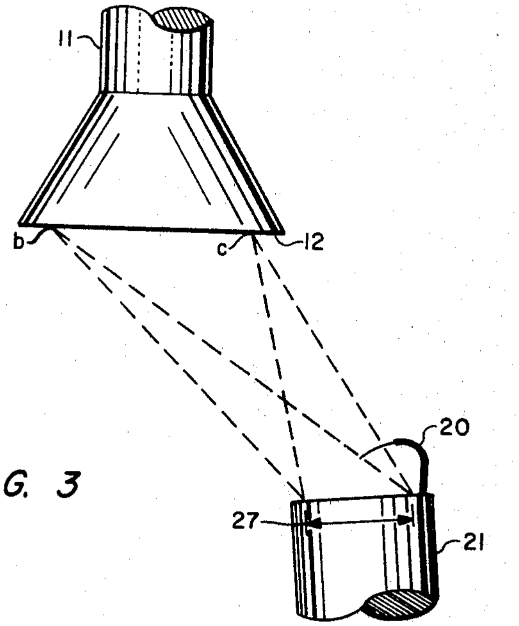
FIG. 3 is an enlarged view illustrating the attenuating action of the vignetter of FIGS. 2A and 2B.

FIGURE 3 is an enlarged view illustrating the action of vignetter 20 in attenuating radiation from two points $b$ and $c$ on screen 12 of CRT 11. FIGURE 3 is of necessity two dimensional, but the radiation would in actuality be three dimensional, so that cones of light from points $b$ and $c$ radiate to the light sensitive area of photocathode 27 of photomultiplier 21. The dashed lines drawn from points $b$ and $c$ to the end points of photocathode 27 represent the outer rays in the cross section of the cones of total radiation from points $b$ and $c$ that would normally initiate a signal from photomultiplier 21 in the absence of vignetter 20. Since the illumination at the photocathode 27 caused by the cone of light from point $c$ is greater than the illumination caused by the cone of light from point $b$ due to the geometry as explained above, vignetter 20 intercepts and attenuates more of the cone of radiation from $c$ than of the cone of radiation from point $b$. The end result is that the illumination at the photocathode 27 caused by radiation from points $b$ and $c$ is equal if the sources $b$ and $c$ are equal.

The active surface of the vignetter may be a photographic film in which the respective areas making up the active surface are exposed for lengths of time corresponding to the degree of opacity desired for that particular area. They may also be three dimensional and of a uniform attenuation gradient with thickness, so that in an area where greater attenuation is required, the vignetter surface would be thicker than an area where less attenuation is required.

With constant illumination across the screen raster line $c$, $a$, $b$, and constant illumination along the imaged scanning line $c_1$, $a_1$, $b_1$ on the information bearing material 32, the vignetter 30 on read out photomultiplier 15 enables the information to be read out according to the energy absorptive properties of the bits of information themselves without errors due to transmission deficiencies.

Figure 2B:
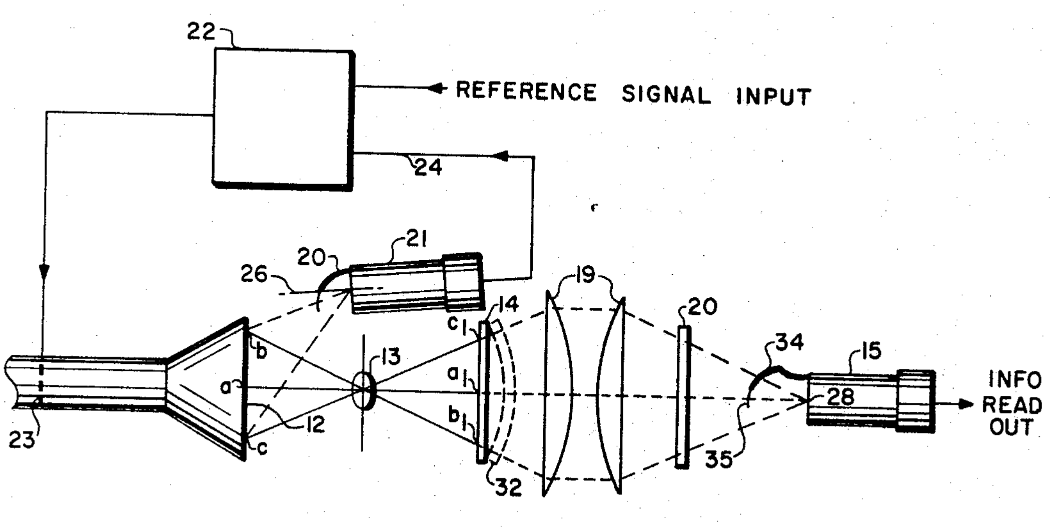
FIG. 2B is a diagrammatic representation of a transparent type embodiment of the flying-spot scanning system of the present invention.

FIGURE 2B illustrates the present invention as applied to compensate for errors in the conventional transparency type flying-spot scanner system of FIGURE 1B. The same identifying numerals are used to identify the same components shown in the reflection type embodiment of FIGURE 2A which produce similar results in the transparency type system of FIGURE 2B. Note that vignetter 34 is so constructed that the filter portion 35 filters the central rays of energy relative to the outer rays $c_1$ 28 and $b_1$ 28, as the outer rays are attenuated much more due to their optical path compared to the path of the central ray $a_1$ 28. Again the transparency 14 may be formed to present a spherical surface 32 making the optical paths and cosine $\theta$'s equal for each spot projection on the scanned surface 32 and making the attenuation per ray equal from tube screen 12 to information bearing surface 32.

Figure 4:
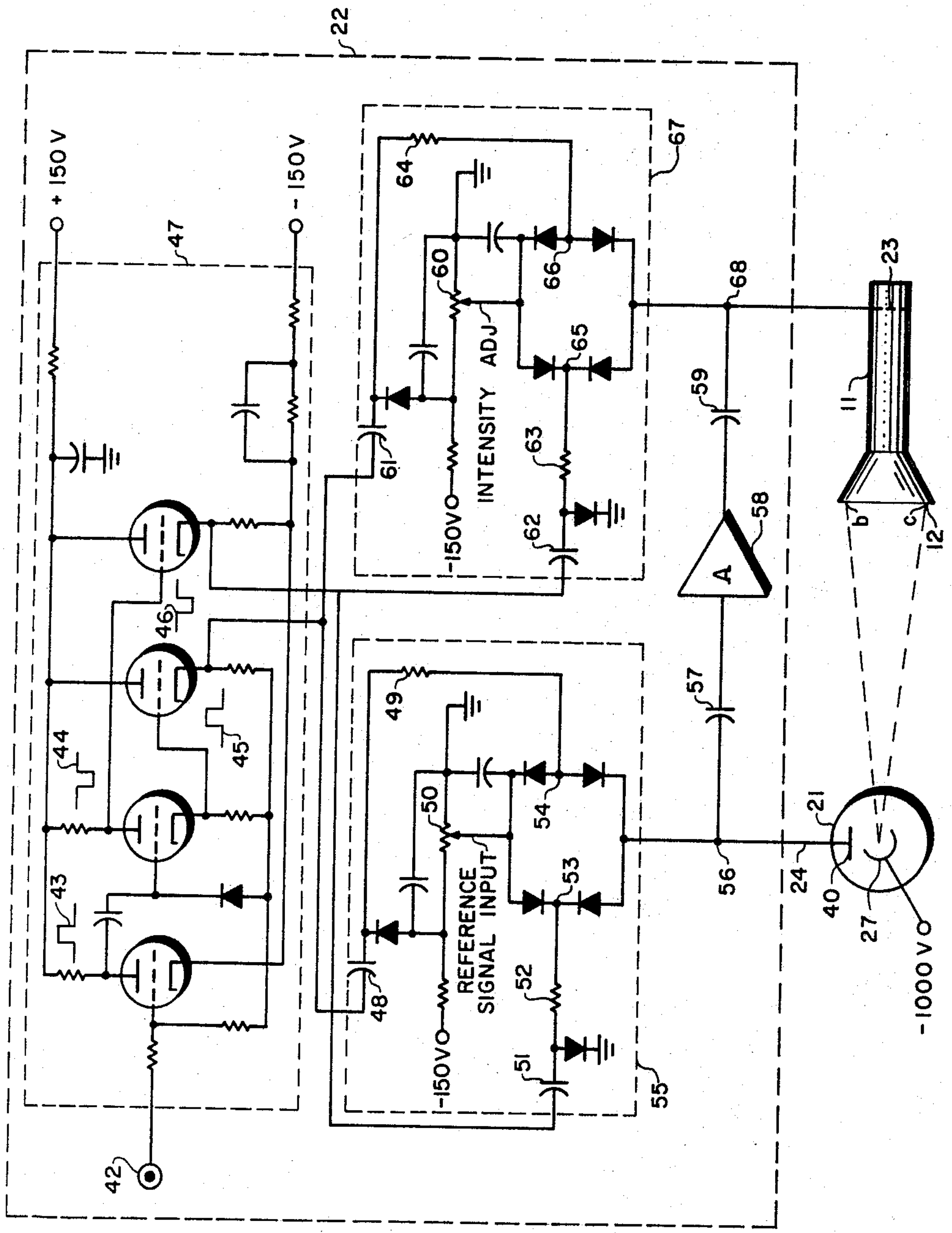
FIG. 4 is a schematic representation of the comparator block shown in FIGS. 2A and 2B.
Figure 4:
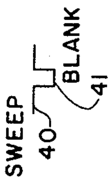

FIGURE 4 is an electrical schematic diagram illustrating the operation of the feedback loop of FIGURES 2A and 2B. Sweepblank signal 40 enters pulse converter 47 through jack 42. Negative blanking pulse 41 is converted to a pair of amplified positive going and negative going pulses 45 and 46 respectively in pulse converter 47 by taking the amplified signal off the cathode of odd and even stages of amplification. The progress of blanking pulse 41 through converter 47 is shown in wave forms 43, 44, 45 and 46.

The reference signal inputs of FIGURES 2A and 2B are obtained by adjusting the arm of potentiometer 50 in clamp 55 to drop the voltage from the negative 150 volt supply to a suitable value that when applied through amplifier 58 to the control grid 23 of CRT 11 will produce the desired spot intensity on screen 12.

Positive going pulse 45 is coupled over capacitor 48 and resistor 49 to point 54, and negative going pulse 46 is coupled over capacitor 51 and resistor 52 to point 53 when the blanking pulse 41 triggers pulse converter 47. This has the effect of short circuiting the two diodes on either side of points 53 and 54 which clamps the negative reference signal to point 56 for the duration of blanking pulse 41 which is sufficient time to charge up capacitor 57. When blanking pulse 41 passes and the sweep portion of sweep-blank signal 40 is applied to pulse converter 47, the short circuit is removed from points 53 and 54 and the negative reference voltage is isolated from point 56, but capacitor 57 is of high capacity and the parameters of the circuit are such that it discharges very slowly, and the reference voltage tends to be maintained at the input of amplifier 58.

As radiant energy, for example from spot points $b$ or $c$ on screen 12 of CRT 11, falls on photocathode 27 of photomultiplier 21, an electron beam is generated and multiplied in the associated dynodes not shown, and collected in collector 40. The internal connections and associated circuitry of photomultiplier 21 are conventional and not shown for purposes of clarity. Collector current proportional to the intensity of the received energy at photocathode 27 flows in the photocathode 27 to collector 40 to capacitor 57 circuit to alter the charge on capacitor 57 during the sweep portion of the cycle. The action of the feedback loop of photocathode 27, collector 40, capacitor 57, amplifier 58, capacitor 59, and control grid 23 is degenerative; that is, increase in collector current tends to decrease control grid voltage and spot intensity, while decrease in collector current tends to increase control grid voltage and spot intensity.

DC restorer 67 acts in the same manner as clamp 55 to restore control grid 23 to its normal operating voltage during the blanking period and to charge capacitor 59 to this voltage. Capacitor 59 also has a large capacity, and the parameters of the circuitry are such that it discharges slowly during the sweep portion of the cycle. The desired operating voltage is set by adjustment of the movable arm on potentiometer 60. As before, positive going pulse 45 is coupled over capacitor 61 and resistor 64 to point 66 and negative going pulse 46 is coupled over capacitor 62 and resistor 63 to point 65 when the blanking pulse 41 triggers pulse converter 47. This short circuits the two diodes on either side of points 65 and 66 and restores the desired intensity voltage to point 68 and control grid 23 for the duration of blanking pulse 41 which is sufficient time to charge capacitor 59.

During the sweep portion of the cycle, collector current flows in photomultiplier 21 to increase or decrease the charge on capacitor 57 proportionately and to operate amplifier 58 as described above which increases or decreases the charge on capacitor 59 proportionately and drives the control grid 23 about the normal voltage set on capacitor 59 during the blanking period to maintain a constant spot intensity.

It can be seen that the objects set forth above have been accomplished by the illustrated and described embodiments. However, only preferred embodiments of the present invention have been shown and described using specific terms and examples but using them in a generic and descriptive sense and not for purposes of limitation, as the scope of the invention is set forth in the following claims:

What is claimed is:

1. A compensated flying-spot scanner comprising:
(a) cathode ray tube means, having a short persistence screen and intensifying means, for sweeping a variable intensity electron beam to illuminate spots on the screen,
(b) differential comparator means, having two inputs, and an output connected to the tube intensifying means for varying the intensity of the beam,
(c) a reference signal corresponding to a desired beam intensity connected to one comparator means input,
(d) photosensitive means connected to the other comparator means input and disposed for receiving spot illumination and in response thereto producing a proportional signal which drives said comparator means to decrease the beam intensity and spot illumination when the photosensitive means signal is greater than the reference signal and to increase the beam intensity and spot illumination when the photosensitive means signal is less than the reference signal, and
(e) filter means disposed in the path between the screen spots and the photosensitive means for attenuating the spot illumination before it is received by said photosensitive means in an amount that is inversely porportional to a function of the distance between the spot and said photosensitive means.

2. A compensated flying-spot scanner comprising:
(a) cathode ray tube means, having a short persistence screen and intensifying means, for sweeping a variable intensity electron beam to illuminate spots on the screen,
(b) differential comparator means, having two inputs, and an output connected to the tube intensifying means for varying the intensity of the beam,
(c) a reference signal corresponding to a desired beam intensity connected to one comparator means input,
(d) photosensitive means connected to the other comparator means input and disposed for receiving spot illumination and in response thereto producing a proportional signal which drives said comparator means to decrease the beam intensity and spot illumination when the photosensitive means signal is greater than the reference signal and to increase the beam intensity and spot illumination when the photosensitive means signal is less than the reference signal, said photosensitive means including a photocathode surface for receiving spot illumination, and
(e) energy attenuating means disposed in the path between the screen and the photocathode surface for attenuating the spot illumination before it is received by said photocathode surface in an amount proportional to the cosine of the angle which the normal to the photocathode surface makes with the direction of the incoming spot illumination.

3. A compensated flying-spot scanning system for reading out information bearing material comprising:
(a) means for generating and scanning a spot of variable intensity radiant energy over the material to be read out,
(b) a reference intensity signal supply means,
(c) differential feedback means having a feedback loop to the generating and scanning means and responsive to sampled radiated energy intensity for comparing said sampled intensity with the reference signal for increasing the spot intensity when it is less than the reference intensity and for decreasing the spot intensity when it is greater than the referenced intensity,
(d) radiant energy detecting means disposed to receive the radiant energy as modified by the material to be read out for producing an output signal responsive to said modified energy indicative of the material information, and
(e) energy attenuating means disposed to intercept the sampled radiated energy for attenuating said sampled radiation in an amount that is inversely proportional to a function of the distance travelled by said radiated energy in reaching said attenuating means.

4. A compensated flying-spot scanning system for reading out information bearing material comprising:
(a) means for generating and scanning a spot of variable intensity radiant energy over the material to be read out,
(b) a reference intensity signal supply means,
(c) differential feedback means having a feedback loop to the generating and scanning means and responsive to sampled radiated energy intensity for comparing said sampled intensity with the reference intensity signal for increasing the spot intensity when it is less than the reference intensity and for decreasing the spot intensity when it is greater than the referenced intensity,
(d) radiant energy detecting means disposed to receive the radiant energy as modified by the material to be read out for producing an output signal responsive to said modified energy indicative of the material information, and
(e) energy attenuating means disposed to intercept the radiant energy modified by the material to be read out for attenuating said modified radiant energy in an amount that is inversely proportional to a function of the distance travelled by said modified energy in going from the material to be read out to the detecting means.

5. A compensated flying-spot scanning system for reading out information bearing material comprising:
(a) means for generating and scanning a spot of variable intensity radiant energy over the material to be read out,
(b) a reference intensity signal supply means,
(c) differential feedback means having a feedback loop to the generating and scanning means and responsive to sampled radiated energy intensity for comparing said sampled intensity with the reference intensity signal for increasing the spot intensity when it is less than the reference intensity and for decreasing the spot intensity when it is greater than the referenced intensity,
(d) radiant energy detecting means disposed to receive the radiant energy as modified by the material to be read out for producing an output signal responsive to said modified energy indicative of the material information, and
(e) energy attenuating means disposed both to intercept the sampled radiated energy for attenuating said sampled radiation in an amount that is inversely proportional to a function of the distance travelled by said radiated energy in reaching said attenuating means, and also to intercept the radiant energy modified by the material to be read out for attenuating said modified radiant energy in an amount that is inversely proportional to a function of the distance travelled by said modified energy in going from the material to be read out to the detecting means.

6. A compensated flying-spot scanning system for reading out information bearing material comprising:
(a) a cathode ray tube flying-spot scanner, having a fast decay screen and intensifying means, for sweeping a variable intensity electron beam across the screen to produce a scanning raster of illuminated spots, (b) differential comparator means, having two inputs, and an output connected to the tube intensifying means for varying the intensity of the beam, (c) a reference signal corresponding to a desired beam intensity connected to one comparator means input, (d) first photosensitive means having its output connected to the other comparator means input and disposed for sampling radiated spot illumination and in response thereto for producing a signal proportional to said spot illumination which drives the comparator means to decrease the beam intensity and spot illumination when the photosensitive means signal is greater than the reference signal and to increase the beam intensity and spot illumination when the photosensitive means signal is less than the reference signal, (e) focusing means for focusing the scanning raster illumination on the information bearing material, (f) second photosensitive means disposed for receiving the illumination as modified by the material to be read out and in response thereto for producing a signal reading out the information on said material.

7. A compensated flying-spot scanning system for reading out information bearing material according to claim 6 in which the second photosensitive means is so disposed with respect to the information bearing material that the geometrical relationship of each scanned portion of said information bearing material to said second photosensitive means is the same as the geometrical relationship of the corresponding portion of the screen scanning raster to the first photosensitive means.

8. A compensated flying-spot scanning system for reading out information bearing material according to claim 6 further including:

(g) filter means disposed to intercept the sampled radiated illumination for attenuating said illumination in an amount that is inversely proportional to a function in an amount that is inversely proportional to mination in reaching said filter means.

9. A compensated flying-spot scanning system for reading out information bearing material according to claim 6 further including:

(g) filter means disposed to intercept the illumination as modified by the material to be read out in an amount that is inversely proportional to a function of the distance travelled by said modified illumination in going from the material to be read out to the filter means.

10. A compensated flying-spot scanning system for reading out information bearing material according to claim 6 further including:

(g) first filter means disposed to intercept the sampled radiated illumination for attentuating said illumination in an amount that is inversely proportional to a function of the distance travelled by said radiated illumination in reaching said first filter means, (h) second filter means disposed to intercept the illumination as modified by the material to be read out in an amount that is inversely proportional to a function of the distance travelled by said modified information in going from the material to be read out to the second filter means.

11. A compensated flying-spot scanning system for reading out information bearing material according to claim 6 in which the second photosensitive means is so disposed with respect to the information bearing material that the geometrical relationship of each scanned portion of said information bearing material to said second photosensitive means is the same as the geometrical relationship of the corresponding portion of the screen scanning raster to the first photosensitive means, and further including:

(g) first filter means disposed to intercept the sampled radiated illumination for attenuating said illumination in an amount that is inversely proportional to a function of the distance travelled by said radiated illumination in reaching said first filter means, (h) second filter means disposed to intercept the illumination as modified by the material to be read out in an amount that is inversely proportional to a function of the distance travelled by said modified information in going from the material to be read out to the second filter means.

References Cited

UNITED STATES PATENTS

| | | | |
|---|---|---|---|
| 2,415,191 | 2/1947 | Rajchman | 250—217 |
| 2,719,247 | 9/1955 | Bedford | 178—7.2 |
| 2,915,582 | 12/1959 | Shapiro | 178—7.2 |
| 3,173,015 | 3/1965 | Moneypenny et al. | 250—217 |

RALPH G. NILSON, *Primary Examiner.*

J. D. WALL, *Assistant Examiner.*